UNITED STATES PATENT OFFICE.

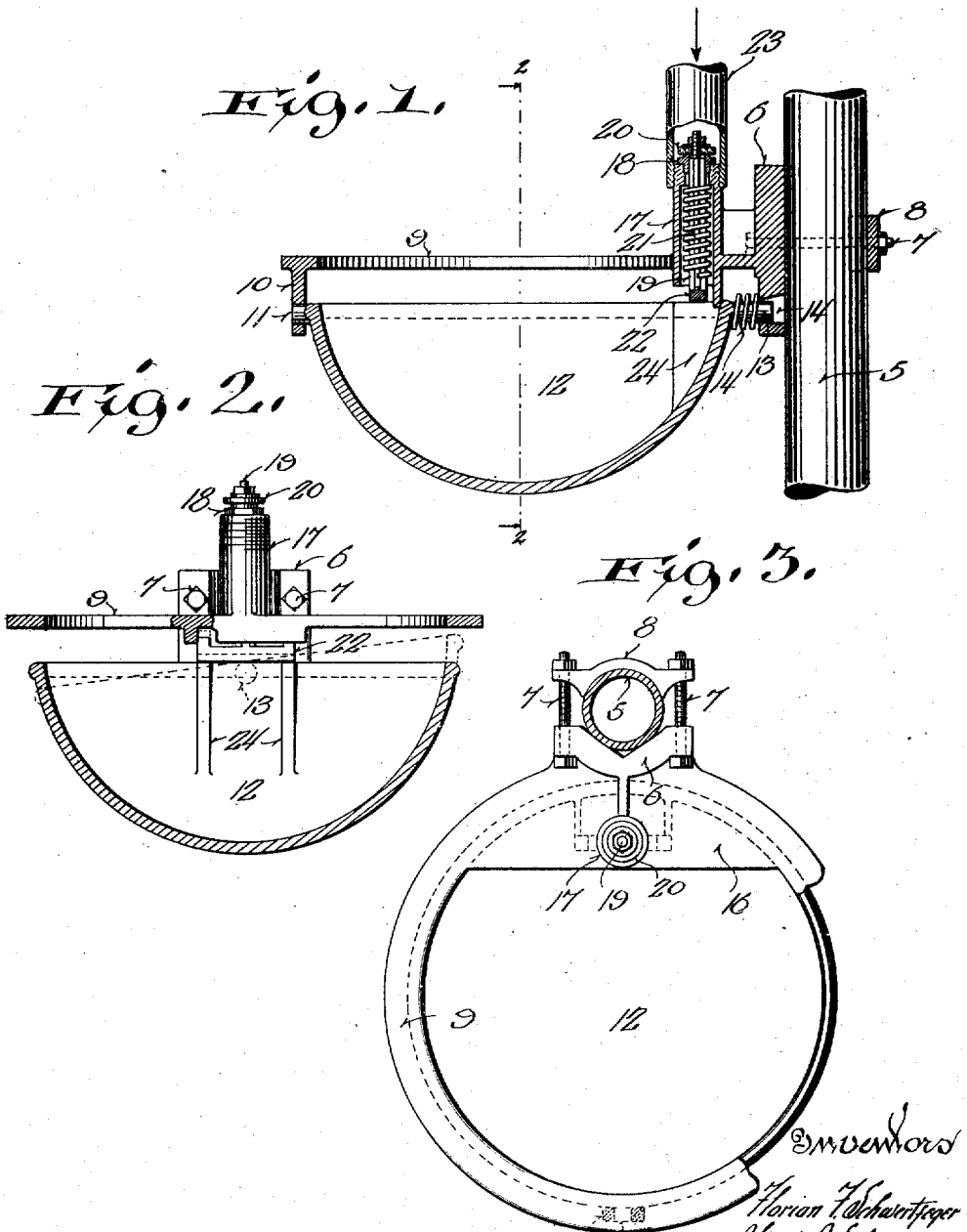

FLORIAN F. SCHWERTFEGER AND ALBERT A. SCHWERTFEGER, OF OSHKOSH, WISCONSIN.

STOCK-WATERER.

1,231,073.  Specification of Letters Patent.  Patented June 26, 1917.

Application filed January 13, 1917. Serial No. 142,150.

*To all whom it may concern:*

Be it known that we, FLORIAN F. SCHWERTFEGER and ALBERT A. SCHWERTFEGER, both citizens of the United States, and residents of Oshkosh, in the county of Winnebago and State of Wisconsin, have invented certain new and useful Improvements in Stock-Waterers; and we do hereby declare that the following is a full, clear, and exact description thereof.

Our invention relates to new and useful improvements in stock waterers, more particularly of that type wherein a proper supply of water is maintained in the bowl by the actuation of suitable mechanism operable by the stock in endeavoring to procure water from the bowl.

Such mechanism for controlling the supply of water has heretofore usually comprised a valve lever position in the bowl, but the provision of such an obstruction in the bowl prevents the removal of all water from the bowl by an animal. It is therefore one important object of our invention to provide a water supply controlling arrangement which involves no obstruction within the bowl.

A further important object resides in the provision of a water supply controlling device which is so arranged as to be operative only upon definite insertion of the head of the animal in the bowl in an effort to procure water from the bowl, whereby accidental actuation of said control means, as by an animal rubbing against the actuating member, is prevented.

Essentially our invention consists in controlling the water supply by bodily movement of the bowl, and it is a still further object to provide a pivotal suspension for the bowl, whereby its overflow is prevented.

A still further object resides in the provision of a bowl associated with a valve mechanism as above set forth in such manner that the bowl may be readily removed as desired for cleaning or other purposes, without affecting the closed position of the valve, and further wherein the valve is efficiently housed at all times to prevent possible damage.

With the above and other objects and advantages in view, the invention resides more particularly in the novel combination, formation and arrangement of parts hereinafter described and pointed out in the appended claims.

In the drawings:

Figure 1 is a vertical sectional view through a stock waterer embodying our invention.

Fig. 2 is a vertical sectional view through the bowl, taken transversely of the plane of the first view, as indicated by the line 2—2 of Fig. 1.

Fig. 3 is a top plan view of the stock waterer, with a portion of the shield ring broken away.

Referring now more particularly to the accompanying drawings, 5 designates an upstanding pipe support to which is clamped a block 6 by means of bolts 7 passed therethrough and through a clamping plate 8 on the opposite side of the support, the opposed faces of the plate and block being concave to fit about the support. Preferably cast integrally with the block 6 and projecting horizontally therefrom is a shield ring 9 and the outer portion of this ring is provided with a depending ear 10 apertured to receive a pintle 11 at the outer portion of the mouth of the drinking bowl 12. The inner portion of the bowl is supported by a diametrically opposed pintle 13 slidably journaled in a bearing opening 14 in the lower portion of the block, and the bowl is normally held in a position whereby it is journally supported from these pintles by an expansible spring 15 on the pintle 13 which resiliently urges the pintle 11 into the ear 10, and which upon compression permits detachment of the pintle 11 from the ear whereby to procure consequent detachment of the bowl.

Preferably integrally upstanding from a web portion 16 at the inner side of the shield ring 9 is an open sleeve 17 which has threaded in its upper end a valve seat bushing 18. A valve stem 19 is slidable in the sleeve and bushing and carries at its upper end a valve head 20 which is resiliently urged to engage on the seat 18 by an expansible spring 21 coiled about the stem and bearing against the reduced upper end of the sleeve 17 and against a transverse head 22 formed on the lower end of the stem below the sleeve 17. A water supply pipe 23 is threaded on the sleeve 17, whereby upon lifting the valve, water will be supplied to the bowl 12, and to procure lifting movement of the valve upon rocking the bowl upon its pivot, the inner portion of the bowl is provided with a pair of spaced inwardly projecting ribs 24 respectively engageable with the transverse head 22 of the valve stem by rocking the bowl in either direction. For guiding the valve stem, the web portion 16 of the shield is provided with depending flanges 25 which slidably engage upturned end projections of the valve stem head 22.

In the operation of our waterer the animal will place its head within the bowl, and press thereagainst to rock the bowl and thus procure a supply of water therein, and inasmuch as no obstructions are afforded in the bottom of the bowl, same may be entirely emptied. By the gravity suspension of the bowl, its horizontal positioning is at all times assured and thus the possibility of overflow is prevented. By the provision of the shield ring 9, accidental actuation of the water supply is also prevented, as by an animal rubbing against the bowl, since it is necessary for the animal to positively insert its head in the bowl to procure actuation of the water supply valve.

To remove the bowl, it is merely necessary to shift it inwardly against the action of the spring 15 to withdraw the pintle 11 from the ear 10, since in the normal horizontal position of the bowl the valve is closed, such detachment of the bowl obviously does not affect the valve, and the valve is incidentally completely protected by its disposition in the sleeve 17 and pipe 23.

While we have shown and described a preferred embodiment of our invention, it will be appreciated that various changes and modifications of structure and arrangement may be resorted to without departing in any manner from the spirit of the invention, as interpreted by the accompanying claims.

What is claimed is:

1. A stock waterer comprising an annular shield, a bowl freely pivotally suspended adjacent said shield at points adjacent its mouth in the vertical plane of its center of gravity whereby to assume by gravity a normal horizontal position, a water supply means including a valve at one side of the shield and means for opening the valve operable upon pivotal movement of the bowl from its normal horizontal position.

2. A stock waterer comprising an annular shield, depending ears at opposed portions of the shield, a bowl, outstanding pintles at the mouth of the bowl journaled in said ears, a water supply means including a valve at one side of the shield and means operable upon pivotal movement of the bowl for actuating said valve.

3. A stock waterer comprising a shield, rigid journal members thereunder, a bowl, pintles on the bowl slidable in the journal members, one of said pintles being of greater length whereby to permit detachment of the bowl and releasable means for urging said bowl to a position wherein both pintles are held in the journal members.

4. A stock waterer comprising a shield, a bowl pivotally suspended adjacent said shield, an upstanding sleeve at one side of the shield, a water supply pipe communicating with the sleeve, a valve seat at the upper end of the sleeve, a stem slidable in the sleeve and having lateral extensions at its lower end engageable by the bowl upon pivotal movement thereof and a valve head at the upper end of the stem.

5. A stock waterer comprising a substantially hemispherical bowl freely pivotally suspended at diametrically opposed points adjacent its mouth whereby to assume by gravity a normal horizontal position, a water supply means including a valve at one side of the bowl and means operable upon pivotal movement of the bowl from its normal horizontal position for opening the valve.

6. A stock waterer comprising a support, a bowl freely pivotally suspended from said support, a water supply means including a valve and means operable upon pivotal movement of the bowl in either direction for opening the valve.

7. A stock waterer comprising a support, a bowl pivotally suspended from said support, a water supply means including a valve, said valve including a valve stem upstanding at one side of the bowl in the vertical plane of its pivotal axis, lateral extensions on said stem, and portions carried by the bowl at the sides of the stem for engagement with said extensions of the stem.

In testimony that we claim the foregoing we have hereunto set our hands at Oshkosh, in the county of Winnebago and State of Wisconsin, in the presence of two witnesses.

FLORIAN F. SCHWERTFEGER.
ALBERT A. SCHWERTFEGER.

Witnesses:
JOHN WILKE,
HENRY SCHWERTFEGER.

Copies of this patent may be obtained for five cents each, by addressing the "Commissioner of Patents, Washington, D. C."